United States Patent [19]

Ruin

[11] 4,256,271
[45] Mar. 17, 1981

[54] FISHING REELS

[75] Inventor: Jean Ruin, Thyez, France

[73] Assignee: Mitchell S.A., Thyez, France

[21] Appl. No.: 3,976

[22] Filed: Jan. 16, 1979

[30] Foreign Application Priority Data

Mar. 6, 1978 [FR] France ................................ 78 06908

[51] Int. Cl.³ .............................................. A01K 89/01
[52] U.S. Cl. ............................................... 242/84.2 G
[58] Field of Search ..................... 242/84.2 G, 84.2 F, 242/84.21 R, 84.21 W

[56] References Cited

U.S. PATENT DOCUMENTS

| | | | |
|---|---|---|---|
| 3,233,845 | 2/1966 | Inamura | 242/84.2 F |
| 4,098,473 | 7/1978 | Sazaki | 242/84.2 G |
| 4,109,880 | 8/1978 | Yamasaki et al. | 84.21 R/ |
| 4,147,313 | 4/1979 | Sazaki | 242/84.2 G |
| 4,162,048 | 7/1979 | Sazaki | 242/84.2 G |

*Primary Examiner*—Billy S. Taylor
*Attorney, Agent, or Firm*—Robert E. Burns; Emmanuel J. Lobato; Bruce L. Adams

[57] ABSTRACT

A fixed spool fishing reel which comprises a rotatable drum with at least one support member mounted thereon spaced from the outer periphery of the drum, a fixed spool for holding line and having a skirt which surrounds the drum, and a pick-up arm pivotally mounted on the support member for movement between an open and a closed position. A release device is provided for moving the pick-up arm from the open to the closed position when the drum is rotated. The release device is cooperable with a stationary stop behind the spool and comprises a double lever constituted by a shaft transverse to the rotational axis of the drum, the shaft having first and second arms. The first arm is cooperable with the stationary stop and the second arm is pivotally connected to one end of a connecting rod, the other end of which is pivotally associated with the pick-up arm. The pivotal connection between the connecting rod and the second arm is always on the same side of a line passing through the pivot axis of the double lever and the pivotal connection between the connecting rod and pick-up arm.

8 Claims, 7 Drawing Figures

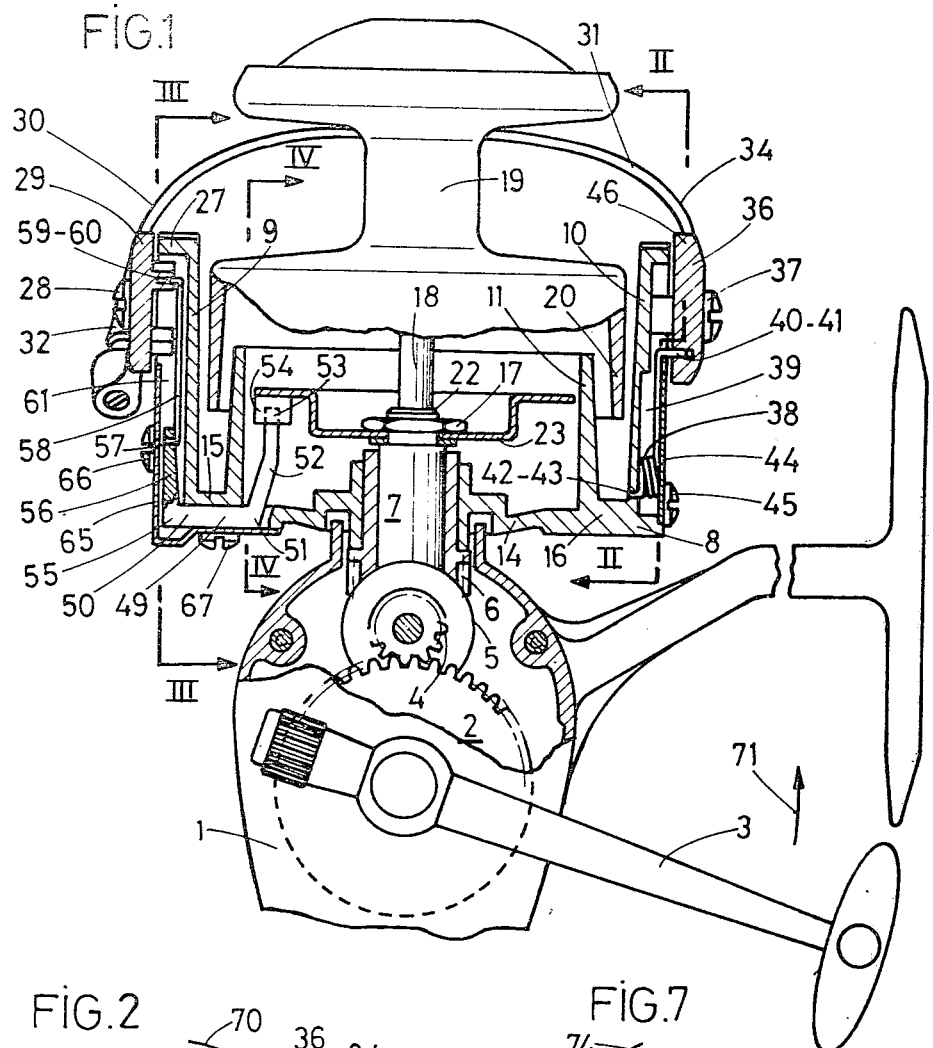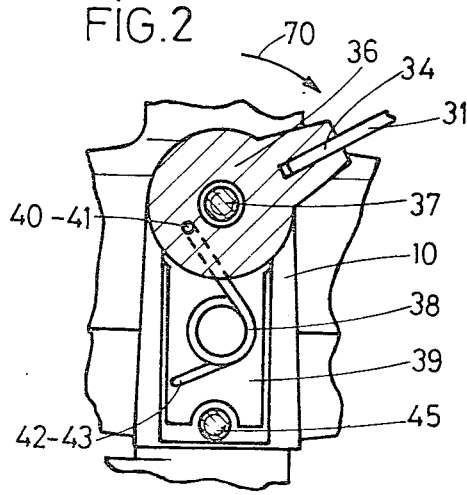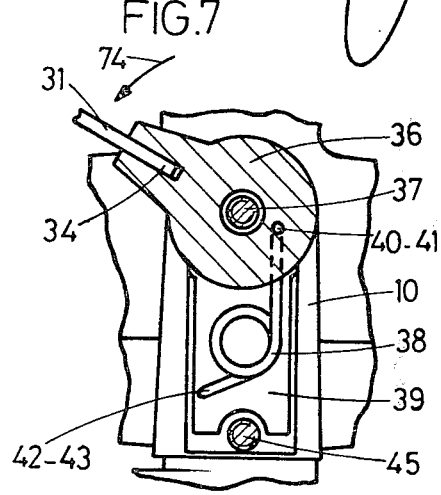

FISHING REELS

FIELD OF INVENTION

The present invention relates to fishing reels, of the type comprising a drum rotatable about an axis generally parallel to that of the rod to which it is intended to be fixed, at least one support member located in the vicinity of the drum along the latter and mounted in the region of the base of the drum by a securing arm, and a non-rotating so-called "enclosing" spool, arranged concentrically to the drum in front of the drum (i.e. above the top of the drum). The spool has a skirt surrounding the periphery of the drum and passes between this periphery and the support arm. A pick-up arm is mounted to rotate on the free end of the support arm. It supports the first end of a pick-up bar whose second end is pivoted on the drum, on the opposite side to the support arm. The pick-up arm is able to occupy either a first "closed" stable angular position, or a second "open" stable angular position, under the action of an elastically yieldable "tumbler" device. This pick-up arm is connected kinematically to a release device whereof one part, housed in the drum, is intended to cooperate, during the rotation of the drum, with a fixed stop located behind the spool on the trajectory of said part of the release device, in order to cause the pick-up arm to move from its open position to its closed position.

BACKGROUND OF THE INVENTION

In a known fishing reel of this type, the release device is housed for its part in the support arm. It is constituted by a second "tumbler" device. This second device firstly comprises a first tilting lever. At a first front end, this first lever comprises a lug housed with a certain angular clearance in a housing provided in the pick-up arm. At its second rear end, the first lever comprises an aperture in which is housed one end of a second lever pivoted about an axis parallel to that of the drum. This second lever is housed in the arm for securing the support arm and in the drum. It is connected angularly, with a certain clearance, to a third lever pivoted on the same axis, which is subject to the action of a "tumbler" spring. It will be realised that a release device of this type is complicated and comprises numerous parts, which is a drawback.

SUMMARY OF THE INVENTION

The fishing reel according to the invention comprises a simple release device having relatively few constituent parts, but nevertheless allowing release of the pick-up arm and of the pick-up bar, either by an action on the crank itself rotating the drum, or by direct action on the pick-up bar in order to move the pick-up arm manually from its open position to its closed position, without the release device preventing such a change of position.

According to the present invention there is provided fishing reel comprising a rotatable drum, at least one support member spaced from the periphery of the drum and mounted in the region of the base of the drum by a securing arm, a non-rotatable spool concentric with the drum and positioned above the top of the drum, the spool having a skirt which surrounds the periphery of the drum and passes between this periphery and the support arm, a pick-up arm rotatably mounted on the support member, said pick-up arm supporting the first end of a pick-up bar having a pivotally mounted second end, and said pick-up arm being able to occupy either a first "closed" stable angular position or a second "open" stable angular position under the action of a resilient tumbler device, and a release device kinematically connected to the pick-up arm, the release device being cooperable, on rotation of the drum, with a stationary stop located behind the spool in order to move the pick-up arm from its open position to its closed position, wherein the release device comprises a double lever constituted by a shaft located transversely with respect to the axis of rotational axis of the drum in the securing member and being able to move in an angular manner inside the latter, this shaft supporting, at its first end located inside the drum, a first arm having a free end cooperable with the stationary stop and, at its second end, a second arm on the free end of which is pivoted the first end of a connecting rod, whose second end is in turn pivotally associated with the pick-up arm, the second arm, the connecting rod and the pick-up arm being shaped such that when the pick-up arm occupies one of its two angular positions, the pivot point of the first end of the connecting rod is always on the same side of a line passing through the pivot point of the second end of said connecting rod and through the pivot axis of the double lever.

BRIEF DESCRIPTION OF DRAWINGS

The accompanying drawings illustrate one embodiment of the fishing reel according to the present invention, by way of example.

FIG. 1 shows this embodiment, according to the invention, seen partly in longitudinal section, the pickup being illustrated in the open position.

FIG. 2 shows the same embodiment, seen partly in section on line II—II of FIG. 1, the pick-up being illustrated in the open position.

FIG. 7 shows the same embodiment, seen partly along a section similar to the section II—II of FIG. 1, the pick-up being illustrated in the closed position.

DESCRIPTION OF PREFERRED EMBODIMENT

Figure 3:
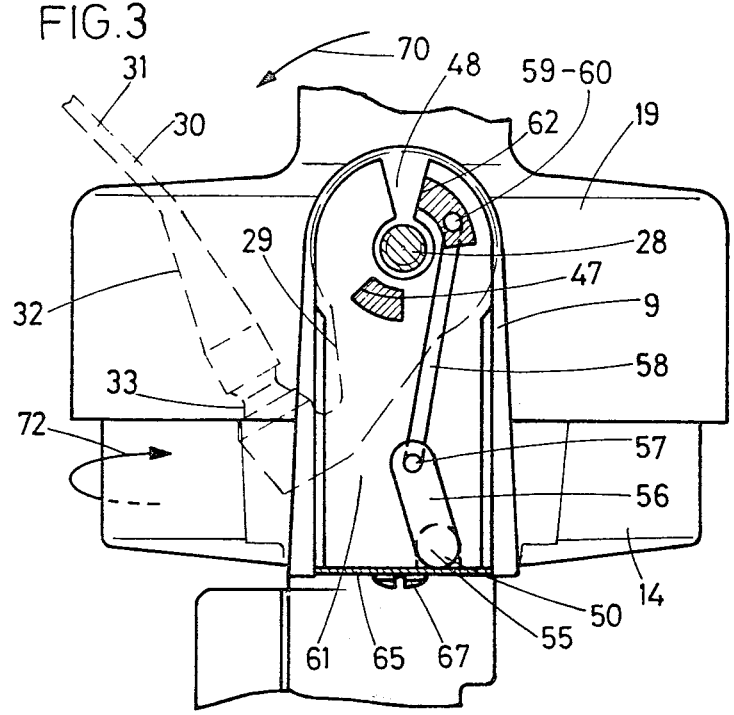
FIG. 3 shows the same embodiment, seen partly in section on line III—III of FIG. 1, the pick-up being illustrated in the open position.
Figure 4:
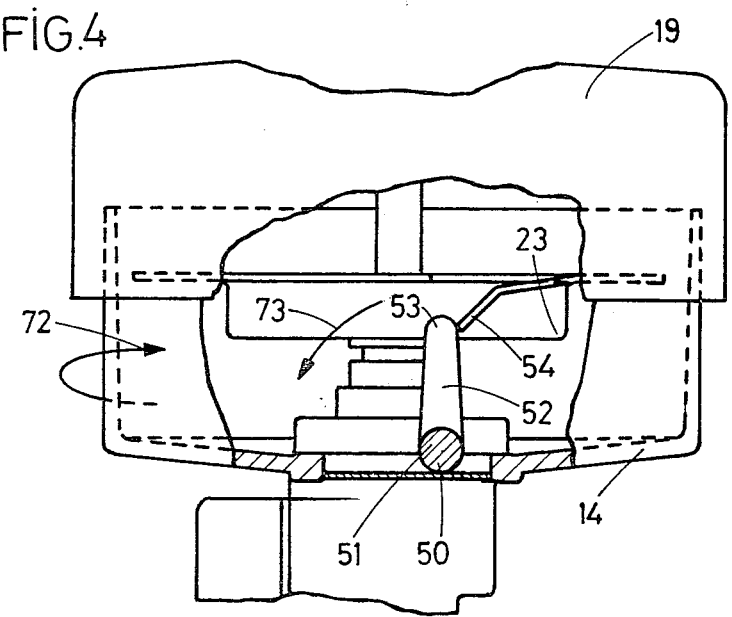
FIG. 4 shows the same embodiment, seen partly in section on line IV—IV of FIG. 1.

As illustrated in particular in FIG. 1, the fishing reel comprises a casing 1 in which is housed a toothed wheel 2 connected to rotate with a crank 3. The toothed wheel 2 meshes with a toothed pinion 4 connected to rotate with a second toothed pinion 5 which in turn meshes with a third toothed pinion 6. The latter is mounted to rotate on a shaft 7 connected to the casing 1. A drum 8 is supported by the toothed pinion 6 with which it is integral. This drum 8 comprises two support members (also referred to herein as support arms) 9, and 10, which are respectively connected to the base 14 of the drum by securing arms 15 and 16 respectively, extending laterally from this base 14. The support arms 9 and 10 are thus located in the vicinity of the drum 8, along the latter, respectively symmetrically on either side of the periphery 11 of the drum 8. In this example, they are arranged parallel to the shaft 7 serving as the axis of rotation of the drum 8. In this example, the securing arms 15 and 16 are perpendicular to the axis of rotation of the drum 8. The free end of the shaft 7 comprises a screw-threaded part 22 to which a stationary washer 23 is fixed, by a nut 17. The shaft 7 is tubular and serves as a bearing for a shaft 18 itself serving as a support for a spool 19 intended to receive the fishing line. This spool 19 comprises an outer skirt 20 surrounding the periphery 11 of the drum 8 and passing between this periphery 11 and the support arms 9 and 10. The shaft 18 and the spool 19 are not able to rotate, but are able to move axially by a mechanism, not shown in the drawing, located in the casing 1.

Figure 5:
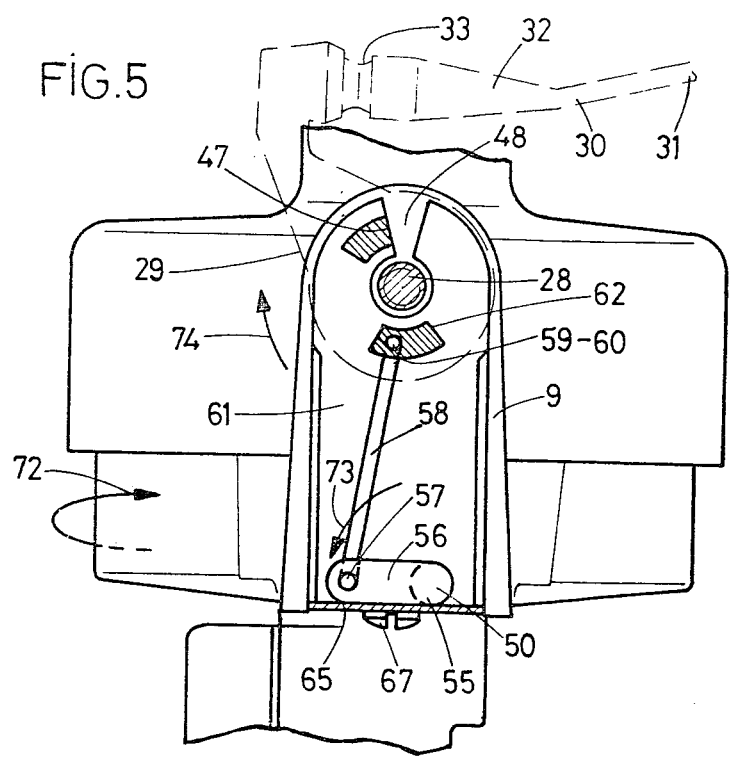
FIG. 5 shows the same embodiment, seen partly along a section similar to the section III—III of FIG. 1, the pick-up being illustrated in the closed position.

As illustrated in FIGS. 1, 3 and 5, at its free end 27, the support arm 9 supports a screw 28 serving as a pivot for a first pick-up arm 29 which supports the first end part 30 of a pick-up bar 31. This first end part 30 terminates in a cone 32 intended to guide the fishing line in a guide roller 33. The second end part 34 of the pick-up bar 31 is supported by a second pick-up arm 36 pivoted about a screw 37 (FIGS. 1, 2, 7) on the free end 46 of the second support arm 10. A torsion spring 38 is housed in a recess 39 in the second support arm 10. Its first bent end 40 is housed in an orifice 41 in the second pick-up arm 36. Its second bent end 42 is housed in an orifice 43 in the second support arm 10. The second pick-up arm 36 and the spring 38 constitute an elastically yieldable tumbler device, which ensures a first "closed" stable angular position (FIGS. 5 to 7), or a second "open" stable angular position (FIGS. 1 to 4) for the two pick-up arms 29 and 36, as well as for the pick-up bar 31.

When the spring 38 occupies the position illustrated in FIG. 7, it tends to rotate the second pick-up arm 36 and therefore also the first pick-up arm 29 constantly in the direction of arrow 74. A stop 47 on the first pick-up arm 29 bears against a fixed boss 48 on the first support arm in order to limit this rotation in the direction of arrow 74 and thus to determine the first "closed" stable angular position (FIG. 5) of the pick-up bar 31. When the spring 38 occupies the position illustrated in FIG. 2, it tends to rotate the second pick-up arm 36 and therefore also the first pick-up arm 29 constantly in the direction of arrow 70. A stop 62 on the first pick-up arm bears against the fixed boss 48 and thus defines the second "open" stable angular position (FIG. 3) of the pick-up bar 31. A cap 44 retained by a screw 45 closes-off the recess 39.

A release device is located in the securing arm 15, in the first support arm 9 and inside the drum 8. It comprises a double lever 49 (FIG. 1) constituted by a shaft 50 located in the securing arm 15 transversely with respect to the axis of rotation of the drum 8. This shaft 50 is able to move solely in an angular manner inside the securing arm 15. At a first end 51, inside the drum 8, it supports a first transverse arm 52 whose free end 53 is intended to co-operate with a fixed stop constituted by a bent tip 54 of the stationary washer 23. At its second end 55 opposite the first end 51, the shaft 50 supports a second transverse arm 56 on the free end of which there is pivoted, in an orifice provided in the latter, the first bent end 57 of a connecting-rod 58 whose second bent end 59 is in turn pivoted in an orifice 60 in the first pick-up arm 29. The second transverse arm 56 and the connecting rod 58 are housed in a recess 61 provided in the first support arm 9. Like the first pick-up arm 29, they have a shape and they are arranged such that when the first pick-up arm 29 occupies one of its two angular positions, either closed or open, the pivot point of the first end 57 of the connecting rod 58 is always on the same side of a line passing through the pivot point of the second end 59 of said connecting rod 58 and through the pivot axis of the shaft 50 of the double lever 49 (FIGS. 3 and 5). A cap 65 retained by two screws 66 and 67 closes-off the recess 61 and at the same time keeps the shaft 50 of the double lever 49 in place.

During the "casting" operation, the various parts occupy the position illustrated in FIGS. 1 to 4. The pick-up bar 31 has been moved manually in the direction of arrow 70 (FIGS. 2 and 3) by the fisherman. The two pick-up arms 29 and 36 occupy their second "open" angular position. They are retained in this stable position by the torsion spring 38 of the elastically yieldable tumbler device located in the second support arm 10. Inside the drum 8, the stationary stop 54 is on the trajectory of the free end 53 of the first transverse arm 52.

Figure 6:
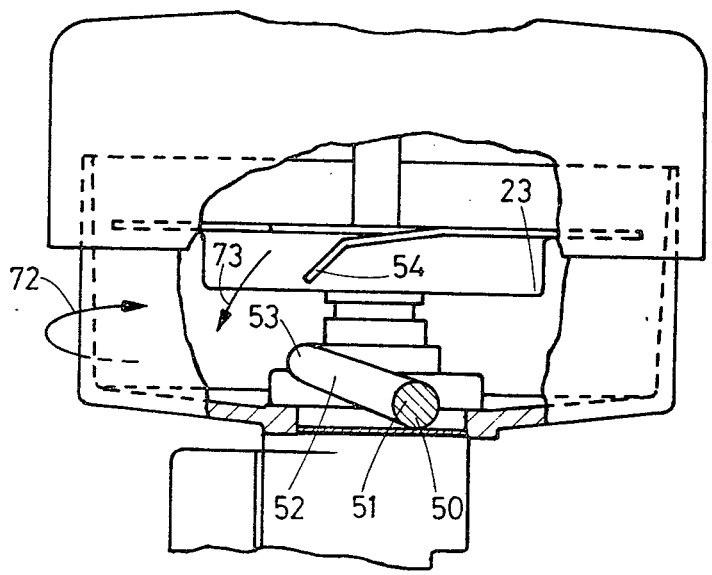
FIG. 6 shows the same embodiment, seen partly along a section similar to the section IV—IV of FIG. 1, the pick-up being illustrated in the closed position.

After the casting operation, the pick-up bar 31 should be moved into its first "closed" position (FIGS. 5 to 7) which makes it possible to return the fishing line to the spool 19. There are two possibilities for this. According to the first possibility, it is sufficient to rotate the crank 3, in the direction of arrow 71 (FIG. 1) and the drum 8 is rotated in the direction of arrow 72 (FIGS. 3 to 6). After one revolution of the drum 8 at the maximum, the end 53 of the first transverse arm 52 comes to bear against the stationary stop 54 which causes it to tilt in the direction of arrow 73 (FIG. 6). The second transverse arm 56 pivots in the same direction (FIG. 5) thus rotating the first pick-up arm 29 and consequently the pick-up bar 31 and the second pick-up arm 36 in the direction of arrow 74 (FIG. 5) by means of the connecting rod 58. As soon as the tumbler device exceeds its tilting point, the second pick-up arm 36, the pick-up bar 31 and the first pick-up arm 29 continue their rotation in the direction of arrow 74 (FIG. 5) under the action of the spring 38 and finally occupy their first "closed" stable angular position (FIG. 5). In this position, the free end 53 of the first transverse arm 52 is no longer able to come into contact with the stationary stop 54, upon each revolution of the drum 8.

According to the second possibility, it is possible to achieve the same result without rotating the crank 3. For this it is sufficient to grip the pick-up bar 31 by hand and to rotate the latter in the direction of arrow 74 (FIG. 5) until the tumbler device exceeds its tilting point and as in the first case, moves said pick-up bar into its first "closed" stable angular position (FIG. 5). At the same time, the rotation of the first pick-up arm 29 in the direction of arrow 74 has caused the rotation of the second transverse arm 56 and therefore of the first transverse arm 52 in the direction of arrow 73, by means of the connecting rod 58, which first transverse arm 52 is thus disengaged from the stationary stop 54. Rotation of the crank 3 in the direction of arrow 71 thus makes it possible to wind the fishing line on the spool 19.

Without diverging from the framework of the present invention, the fishing reel could comprise a single support arm 9 for example. In fact, as will be ascertained, the elastically yieldable tumbler device and the release device comprise few constituent parts and the latter, which are not bulky, could be housed in the single first support arm 9. The support arm 10 could thus be dispensed with, the corresponding end 34 of the pick-up bar 31 for example being bent and pivoted directly to a rear part of the periphery 11 of the drum 8. This end 34 could be pivoted at the point occupied by the securing arm 16 for example.

The fishing reel which is the object of the invention may be used in particular for spinning.

What is claimed is:

1. A fishing reel comprising a casing, a drum having a base rotatably supported by said casing, means for manually rotating said drum, a non-rotating spool concentric with said drum and positioned above said drum, at least one support arm spaced from the periphery of the drum, a securing arm connecting said support arm with the base of said drum, a pick-up arm rotatably mounted on said support arm, a pick-up bar extending across said spool having one end supported by said pick-up arm and the other end pivotally mounted for movement with said pick-up arm between an open position and a closed position, resilient tumbler means for resiliently holding said pick-up bar in which ever of said positions it occupies, and release means for moving said pick-up bar from open position to closed position upon rotation of said drum, said release means comprising a double lever having a shaft portion extending transversely of the rotational axis of the drum and rotatably supported by said securing arm, a first arm inside the drum and a second arm outside the drum, a stationary stop positioned to be engaged by said first arm to pivot said double lever about the axis of said shaft portion upon rotation of said drum, and a connecting rod having a first end pivotally connected to said second arm of said double lever and a second end pivotally connected with said pick-up arm, the pivot point of said first end of said connecting rod with said second arm of the double lever being always on the same side of a line connecting the pivot point of the second end of said connecting rod with the axis of the shaft portion of said double lever, whereby said double lever is pivoted about the axis of said shaft portion by engagement of said first arm of said double lever with said stationary stop upon rotation of said drum and acts through said connecting rod to pivot said pick-up arm and thereby move said pick-up bar from open to closed position.

2. A fishing reel as claimed in claim 1, wherein there is a second support arm opposite said first mentioned support arm and connected with the base of said drum by a second securing arm, and wherein said second end of said pick-up bar is supported by a second pick-up arm pivotally mounted on said second support arm.

3. A fishing reel as claimed in claim 1 wherein the support arm, securing arm and drum are integral.

4. A fishing reel as claimed in claim 2, wherein both support arms and securing arms are integral with the drum.

5. A fishing reel as claimed in claim 1 wherein the stationary stop is provided by a bent portion of a stationary washer mounted within the drum.

6. A fishing reel as claimed in claim 1 wherein said resilient means tumbler comprises a torsion spring.

7. A fishing reel as claimed in claim 2, wherein said resilient tumbler means comprises a spring having a first end bearing on said second support arm and a second end pivotally bearing on said second pick-up arm at a point which is on one side of a line connecting said first end with the pivot axis of said second pick-up arm when said pick-up bar is in open position and on the opposite side of said line when said pick-up bar is in closed position.

8. A fishing reel as claimed in claim 7, in which said spring is a tortion spring.

* * * * *